(12) United States Patent
Shafer et al.

(10) Patent No.: US 8,720,981 B1
(45) Date of Patent: May 13, 2014

(54) VEHICLE FLOOR FRAME STIFFENER

(71) Applicant: Honda Motor Co., Ltd., Tokyo (JP)

(72) Inventors: Patrick M. Shafer, Hilliard, OH (US); Takashi Nakano, Columbus, OH (US); Kishore K. Pydimarry, Dublin, OH (US); Brandon D. Koester, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/797,844

(22) Filed: Mar. 12, 2013

(51) Int. Cl.
*B60N 99/00* (2006.01)
*B62D 21/15* (2006.01)
*B62D 25/20* (2006.01)

(52) U.S. Cl.
CPC .............. *B62D 21/152* (2013.01); *B62D 25/20* (2013.01)
USPC ................... 296/193.07; 296/187.08; 296/204

(58) Field of Classification Search
CPC ............................... B62D 21/152; B62D 25/26
USPC ............. 296/187.08, 187.09, 187.11, 193.07, 296/193.08, 193.09, 203.02, 203.04, 204
See application file for complete search history.

(56) References Cited

U.S. PATENT DOCUMENTS

| | | | |
|---|---|---|---|
| 1,343,428 A | 6/1920 | Berry | |
| 1,835,260 A | 12/1931 | Barrera | |
| 1,895,518 A | 1/1933 | Peck | |
| 1,998,380 A | 4/1935 | Medoff | |
| 2,384,893 A | 9/1945 | Crook | |
| 2,475,786 A | 7/1949 | Jordan | |
| 3,185,411 A | 5/1965 | Gembe | |
| 3,288,397 A | 11/1966 | Fitzpatrick | |
| 3,346,216 A | 10/1967 | Desmarteau | |
| 3,620,485 A | 11/1971 | Gelhard | |
| 4,685,640 A | 8/1987 | Warrington | |
| 4,967,983 A | 11/1990 | Motts | |
| 5,071,090 A | 12/1991 | Takahashi | |
| 5,385,378 A * | 1/1995 | Hakamada et al. | 296/37.12 |
| 5,609,386 A | 3/1997 | Takahashi et al. | |
| 5,645,248 A | 7/1997 | Campbell | |
| 6,076,878 A * | 6/2000 | Isano | 296/37.12 |
| 6,109,653 A | 8/2000 | Maruyama et al. | |
| 6,354,535 B1 | 3/2002 | Perry | |
| 6,427,943 B2 | 8/2002 | Yokomaku | |
| 6,435,102 B1 * | 8/2002 | Malkovsky | 105/413 |
| 6,592,175 B2 | 7/2003 | Shibata | |
| 6,607,163 B2 | 8/2003 | Perry | |
| 6,676,183 B2 * | 1/2004 | Yoshida et al. | 296/30 |
| 6,766,982 B2 | 7/2004 | Drucker | |
| 7,036,852 B2 * | 5/2006 | Cho | 292/33 |
| 7,104,597 B2 | 9/2006 | Osato et al. | |

(Continued)

*Primary Examiner* — Lori Lyjak
(74) *Attorney, Agent, or Firm* — Rankin, Hill & Clark LLP (57) ABSTRACT

A vehicle frame structure includes a longitudinal floor frame member and a frame stiffener connected with the floor frame member. The floor frame member connects with a vehicle floor panel to form a substantially closed cross section. The floor frame member includes a lower wall including a lower section, a higher section, and a transition section disposed between the lower section and the higher section. The lower wall transitions upward along the transition section from the lower section to the higher section. The frame stiffener connects with the floor frame member on an exterior of the floor frame member. The frame stiffener has a substantially U-shaped configuration in cross section and includes a bottom wall that is vertically offset below the lower wall of the floor frame member at least along a portion of the transition section.

19 Claims, 6 Drawing Sheets

(56) References Cited

U.S. PATENT DOCUMENTS 8,646,833 B2 * 2/2014 Fujii et al. .................... 296/209

2009/0200416 A1 8/2009 Lee
2010/0270830 A1 10/2010 Maruyama
2012/0153679 A1 6/2012 Yasuhara et al.

* cited by examiner

VEHICLE FLOOR FRAME STIFFENER

BACKGROUND

Longitudinal floor frame members connect to a vehicle floor and form components of a vehicle frame structure. Vehicles typically include two main longitudinal floor frame members, one on each side of a longitudinal centerline of the vehicle. For minivans, vans and other similar vehicles, the main longitudinal floor frame members can transition in height through the same area in a longitudinal direction as a sliding door opening of the vehicle.

During a frontal crash event, the mass of the rear portion of the vehicle continues forward. During a crash event, frame members tend to give at transition areas, e.g., bends and changes in height, of the frame member. Since the main longitudinal floor frame members transition in height through the same area as the sliding door opening, higher deformation of the vehicle body can occur in the sliding door opening during a frontal crash event.

BRIEF DESCRIPTION

An example of a vehicle frame structure includes a longitudinal floor frame member and a frame stiffener connected with the floor frame member. The floor frame member connects with a vehicle floor panel to form a substantially closed cross section. The floor frame member includes a lower wall including a lower section, a higher section, and a transition section disposed between the lower section and the higher section. The lower wall transitions upward along the transition section from the lower section to the higher section. The frame stiffener connects with the floor frame member on an exterior of the floor frame member. The frame stiffener has a substantially U-shaped configuration in cross section and includes a bottom wall that is vertically offset below the lower wall of the floor frame member at least along a portion of the transition section.

An example of a vehicle body structure includes a vehicle body, a longitudinal floor frame member, and a frame stiffener. The vehicle body includes a floor panel and defines a sliding door opening. The longitudinal floor frame member connects with a lower surface of the floor panel to form a substantially closed cross-section. The floor frame member includes a lower wall including a lower section, a higher section, and a transition section disposed between the lower section and the higher section. The lower wall transitions upwards along the transition section from the lower section to the higher section. At least a portion of the transition section is positioned in a longitudinal direction between a forward edge and a rearward edge of the sliding door opening. The frame stiffener connects with the floor frame member. The frame stiffener has a substantially U-shaped configuration in cross section and includes a bottom wall that is vertically spaced from the floor frame member at least along a portion of the transition section.

DETAILED DESCRIPTION

The figures discussed below are not to scale. As used in this description, lateral directions are transverse across the vehicle, i.e., left and right directions. Longitudinal directions refer to forward and rearward directions of vehicle travel. Vertical directions refer to elevation, i.e., upward and downward directions.

Figure 1:
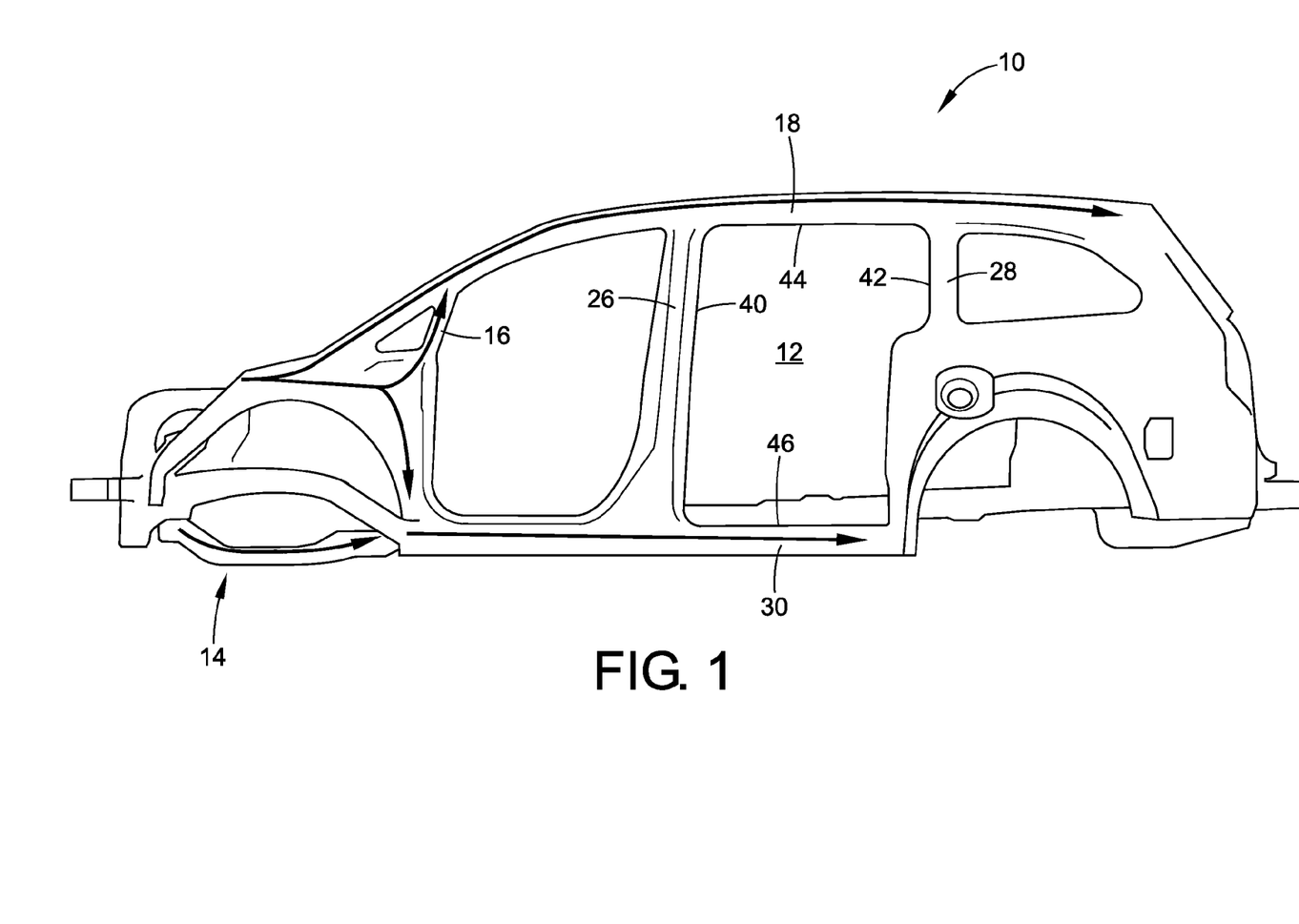
FIG. 1 is a schematic side view of a vehicle body showing a load path resulting from a frontal impact.
Figure 2:
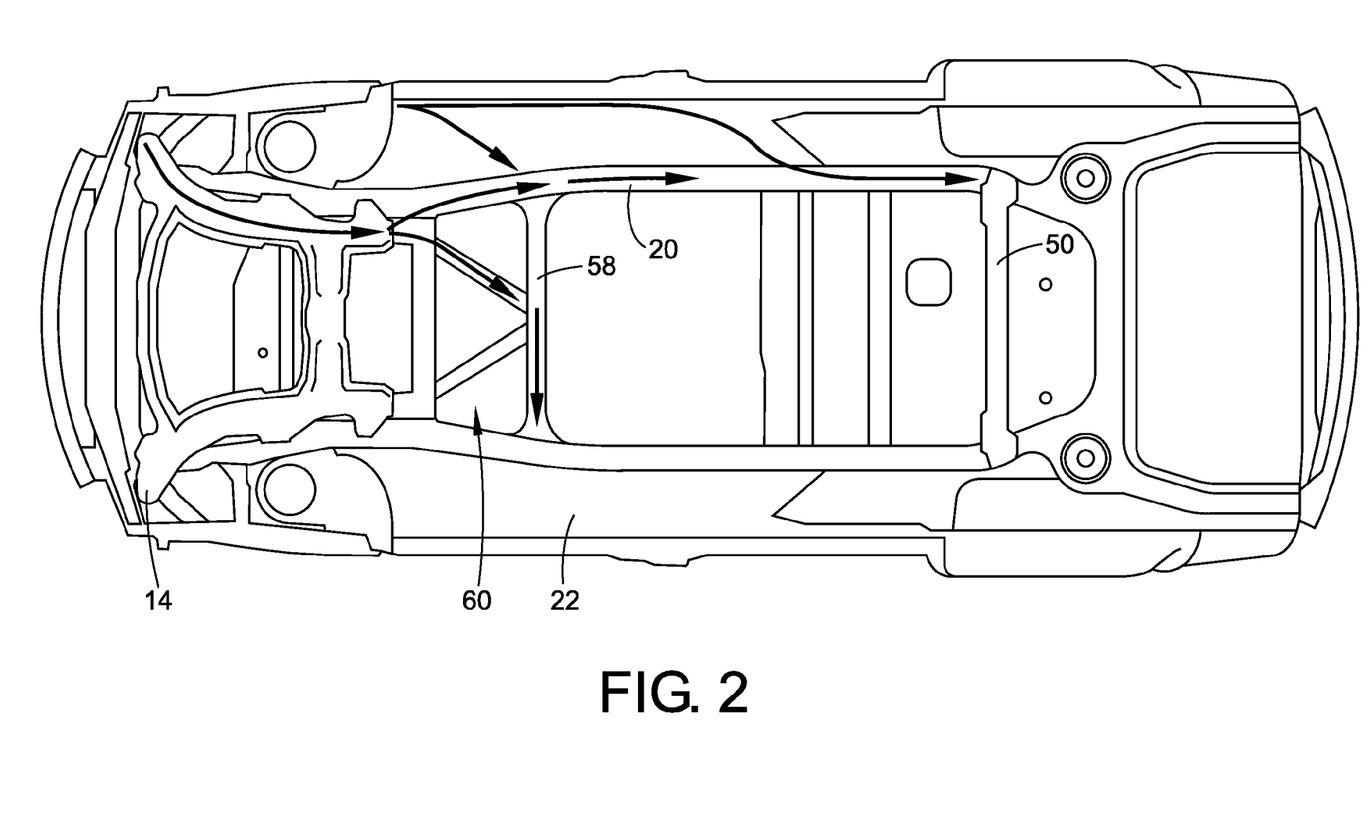
FIG. 2 is a schematic plan view of a vehicle floor structure showing a load path resulting from a frontal impact.

FIG. 1 illustrates a vehicle body 10 having a sliding door opening 12. The vehicle body 10 shown in FIG. 1 is for a vehicle that is known as a minivan; however, the components and structures described below are not limited to use only with a minivan. A front subframe 14 attaches with the vehicle body 10. During a frontal crash event, the load path (depicted by the arrows in FIG. 1) is through the front frame subframe 14 and rearward in a longitudinal direction. FIG. 1 also shows that during a front crash event, the load path can travel through an A-pillar 16 and then longitudinally rearward along a roof rail 18. FIG. 2 depicts the load path for a narrow offset front crash where the load travels through the front subframe 14 and then rearwardly longitudinally along a longitudinal floor frame member 20.

With reference to FIG. 2, two longitudinal floor frame members 20 are provided as part of the vehicle frame structure; one on each side of a longitudinal center line (not shown) of the vehicle. Each longitudinal floor frame member 20 connects with a vehicle floor panel 22 and forms a part of a vehicle floor frame structure 24 (FIGS. 5 and 6).

With reference back to FIG. 1, the vehicle body 10 further includes a B-pillar 26 rearward of the A-pillar 16 and a C-pillar 28 rearward of the B-pillar 26. The vehicle body 10 further includes a side sill 30. The sliding door opening 12 is disposed between the B-pillar 26 and the C-pillar 28, and below the roof rail 18 and above the side sill 30. A forward edge 40 of the sliding door opening 12 is disposed adjacent to B-pillar 26. A rearward edge 42 of the sliding door opening 12 is disposed adjacent to the C-pillar 28. An upper edge 44 of the sliding door opening 12 is disposed adjacent to roof rail 18. A lower edge 46 of the sliding door opening 12 is disposed adjacent to the side sill 30.

Figure 5:
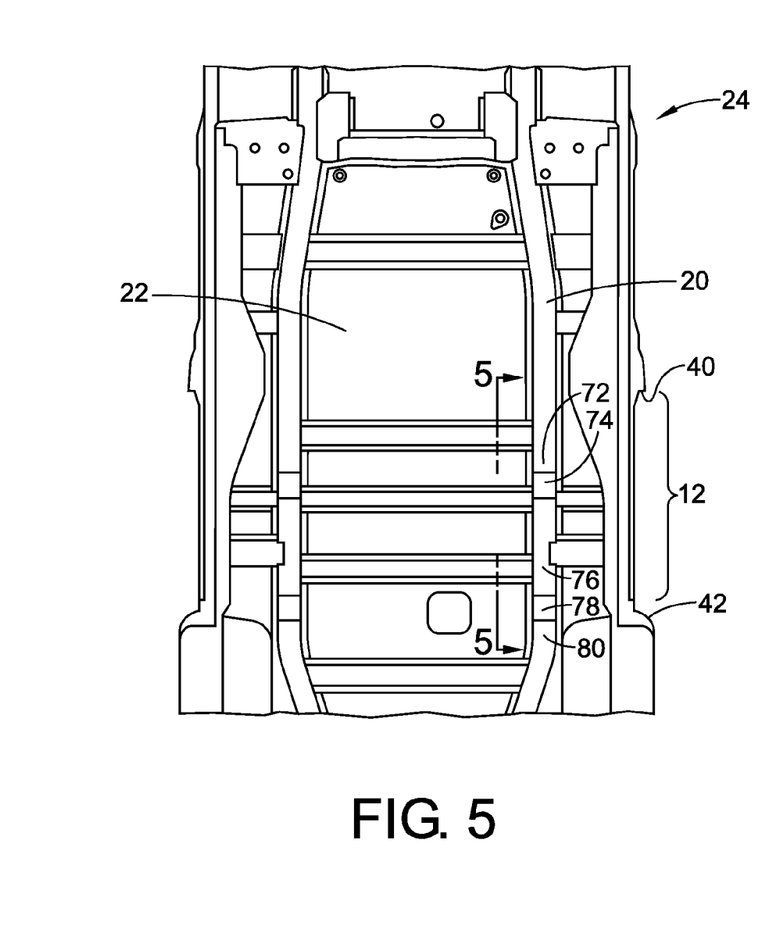
FIG. 5 is a schematic depiction of a portion of the floor frame structure shown in FIG. 2.
Figure 6:
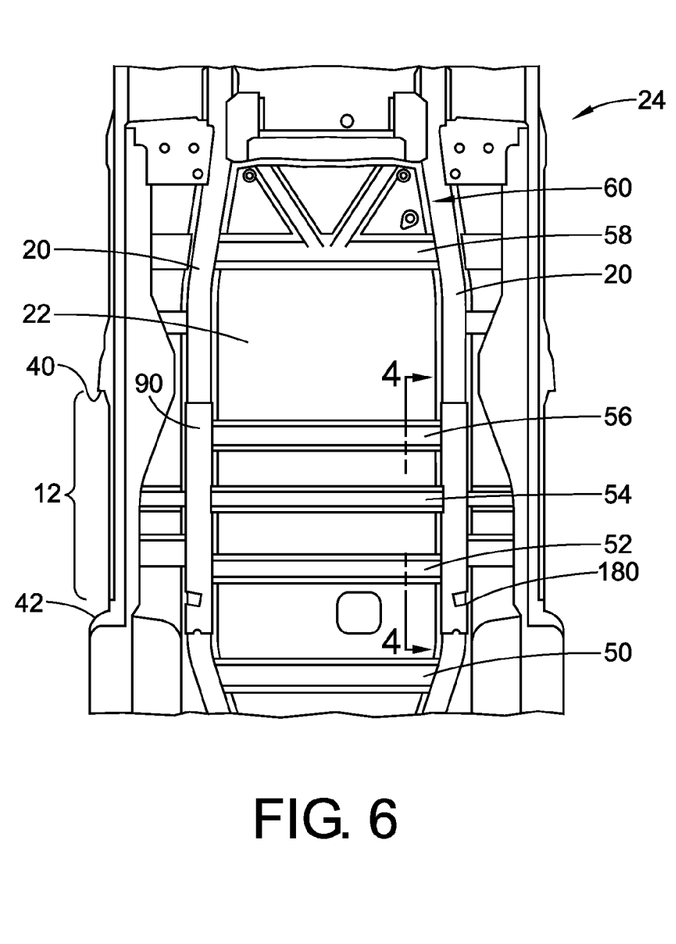
FIG. 6 is a plan view similar to FIG. 5 with the addition of the frame stiffener depicted in FIG. 4 attached to each longitudinal floor frame member depicted in FIG. 5.

With reference to FIGS. 5 and 6, a plurality of cross members 50, 52, 54, 56 and 58 interconnect the longitudinal floor frame members 20. Each cross member 50, 52, 54, 56 and 58 extends along the transverse direction and also connects with the floor panel 22 to further support the floor panel. A front floor frame structure 60 (only shown in FIGS. 2 and 6) is disposed rearwardly from the front subframe 14. As seen in FIG. 2 (the cross members 52, 54 and 56 are not shown in FIG. 2), the front floor frame structure 60 connects with the forward-most cross member 58 and aids in distributing forces from the front of the vehicle into the longitudinal floor frame members 20.

Figure 3:
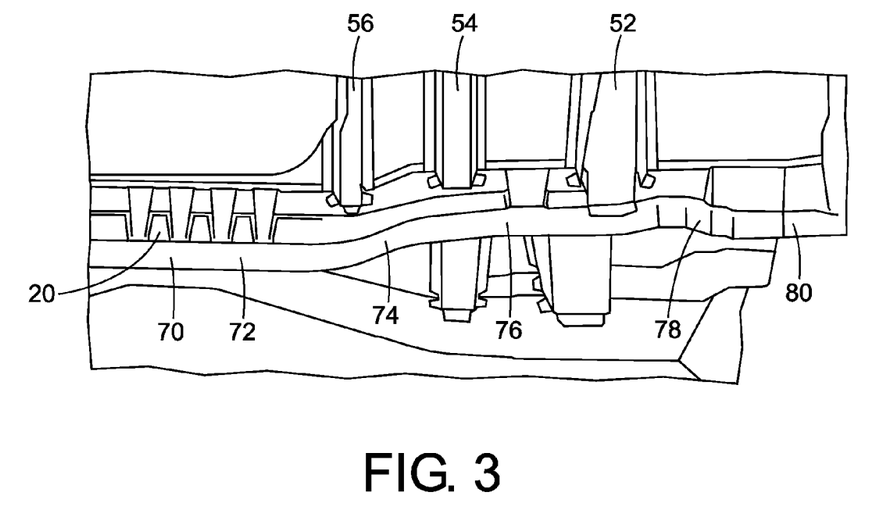
FIG. 3 is a view of a rear portion of the floor frame structure depicted in FIG. 5 taken generally along lines 3-3 in FIG. 5.

FIG. 3 is a slight perspective view to allow for showing a lower wall 70 of the longitudinal floor frame member 20. The lower wall 70 includes a lower section 72, a forward transition section 74, a higher section 76, a rearward transition section 78, and a rear section 80. The lower section 72 is where the lower wall 70 is spaced farthest from the floor panel 22 and is a forward-most section of the lower wall 70. The lower wall 70 transitions upwards to accommodate wheel suspension mounts, which will be described in more detail below. The forward transition section 74, which can also be referred to simply as a transition section, is disposed between the lower section 74 and the higher section 76. The lower wall 70 transitions upward along the forward transition section 74 from the lower section 72 to the higher section 76. As such, the height h1 (see FIG. 7) of the longitudinal floor frame member 20 reduces along the forward transition section 74 moving rearwardly along the longitudinal floor frame member 70.

Figure 4:
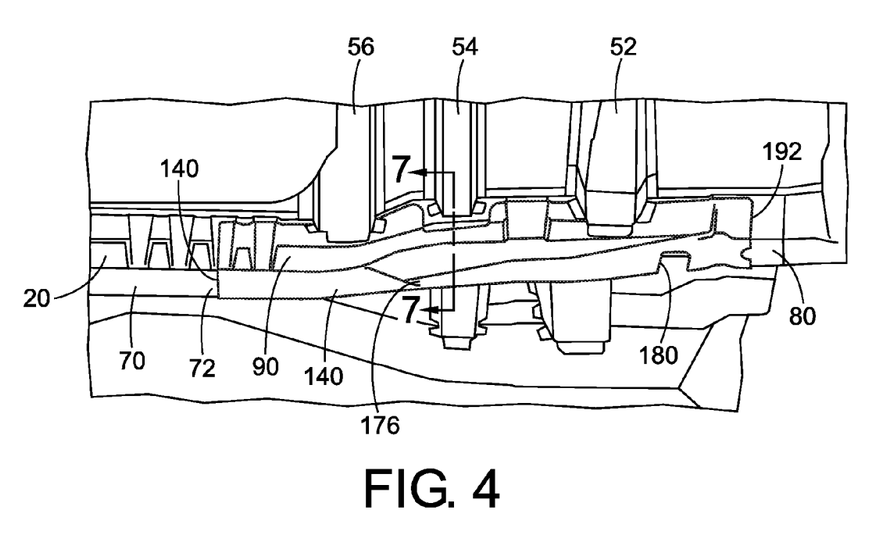
FIG. 4 is a side view similar to FIG. 3 with the addition of a frame stiffener connected with a longitudinal floor frame member taken generally along lines 4-4 in FIG. 6.

With reference to FIG. 5, at least a portion of the transition section 74 of the longitudinal frame member 20 is positioned in a longitudinal direction between the forward edge 40 and the rearward edge 42 of the sliding door opening 12. With reference to FIGS. 4 and 6, a frame stiffener 90 connects with each longitudinal floor frame member 20 on an exterior of the floor frame member 20 to straighten the height levels of the floor frame members 20 and to aid in resisting bending of the floor frame structure 24. The frame stiffener 90 is also configured to reduce deformation within the sliding door opening 12 during a frontal crash event.

Figure 7:
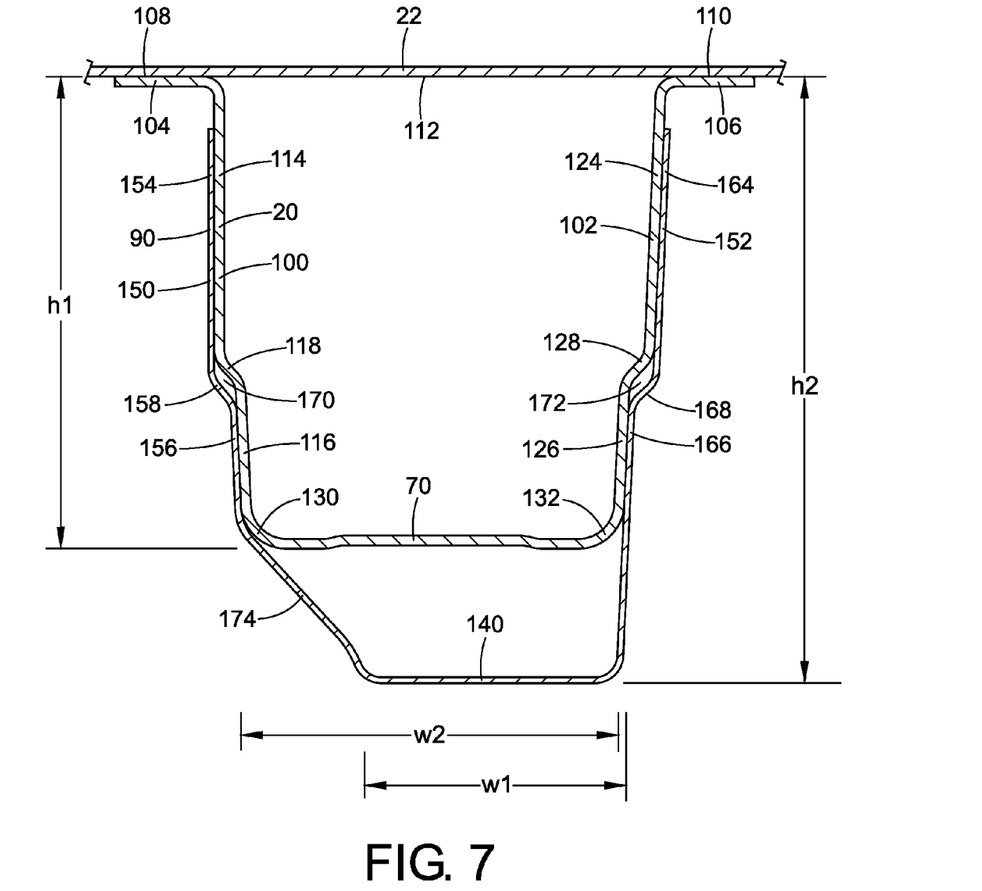
FIG. 7 is a cross-sectional view taken along lines 7-7 of FIG. 4.
Figure 8:
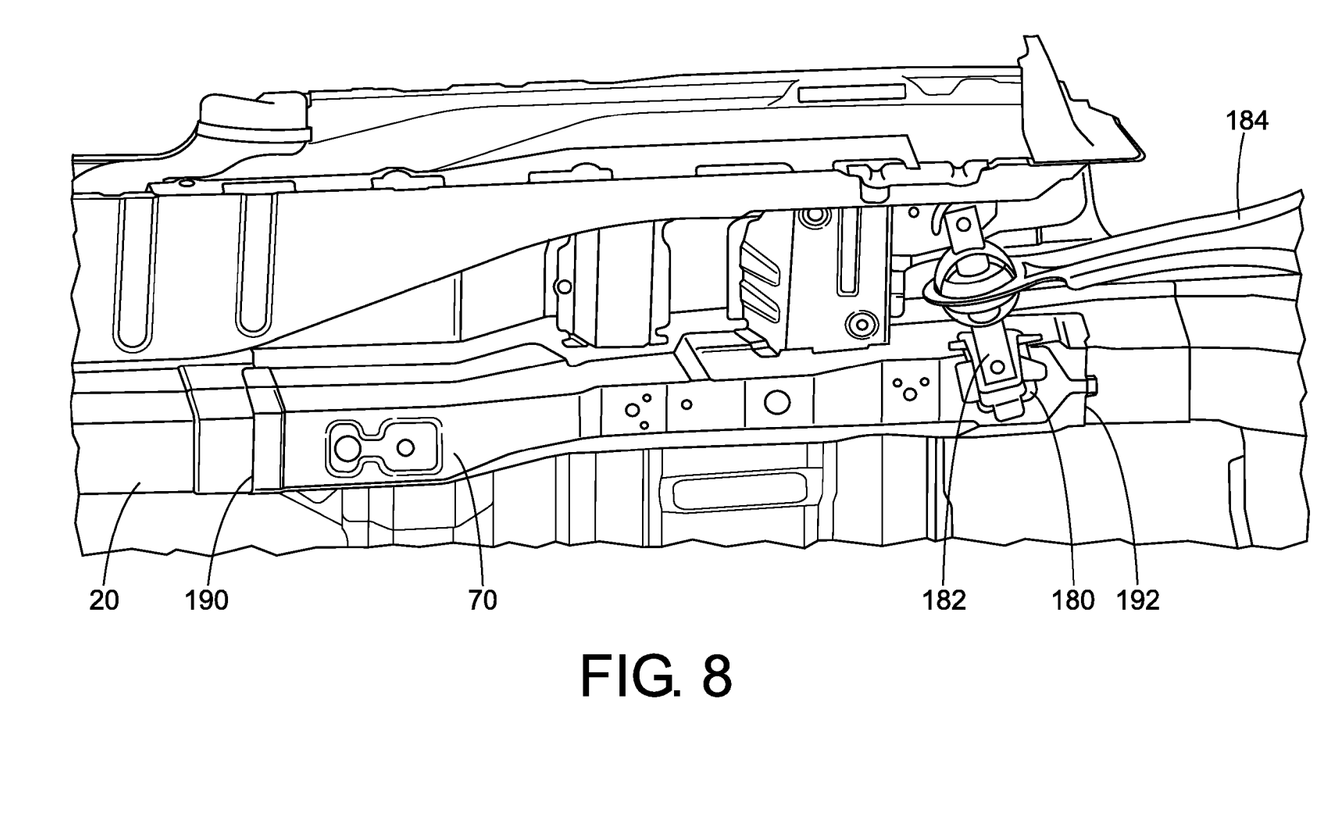
FIG. 8 is a lower perspective view of the floor frame structure showing the longitudinal floor frame member, the frame stiffener, and a rear trailing arm mount connected with the floor frame member.

With reference to FIG. 7, each longitudinal floor frame member 20 connects with the vehicle floor panel 22 to form a substantially closed cross-section. The longitudinal floor frame member 20 is generally U-shaped in cross-section and includes an inner side wall 100, an outer side wall 102, and the lower wall 70 interconnecting the inner side wall 100 to the outer side wall 102. An inner flange 104 extends inwardly away from the inner side wall 100. An outer flange 106 extends outwardly away from the outer side wall 102. Respective uppermost surfaces 108, 110 of each flange 104, 106 contact and connect with a lower surface 112 of the floor panel 22. The inner flange 108 is generally perpendicular to the inner side wall 100, which is substantially vertically oriented. Similarly, the outer flange 106 is substantially perpendicular to the outer side wall 102, which is also substantially vertically oriented. The inner side wall 100 includes a substantially vertical upper section 114, a substantially vertical lower section 116 offset horizontally from the upper section 114 and a tapering transition section 118 interconnecting the upper section 114 to the lower section 116. Similarly, the outer side wall 102 includes a substantially vertical upper section 124, a substantially vertical lower section 126 offset horizontally from the upper section 124 and a tapering section 128 interconnecting the upper section 124 to the lower section 126. The lower section 116 of the inner side wall 100 transitions into the lower wall 70 at an inner lower corner 130. The lower section 126 of the outer side wall 102 transitions into the lower wall 70 at an outer lower corner 132.

With continued reference to FIG. 7, the frame stiffener 90 connects with the floor frame member 20 on an exterior of the floor frame member. The frame stiffener 20 also has a substantially U-shaped configuration cross-section. The frame stiffener 90 also includes a bottom wall 140 that is vertically offset below the lower wall 70 of the longitudinal floor frame member 20 along a portion of the transition section 74. Offsetting the bottom wall 140 of the frame stiffener 90 from the lower wall 70 of the longitudinal frame member 20 creates a straighter path among height levels along the longitudinal frame members 20 and stiffens the frame member 20. The height h2 that the bottom wall 140 of the frame stiffener 90 is offset from the floor panel 22 stiffens the longitudinal frame member 20 along the forward transition section 74 as compared to a longitudinal frame member without the frame stiffener. Since the forward transition section 74 is positioned in a longitudinal direction between the forward edge 40 and the rearward edge 42 of the sliding door opening 12, the vehicle body 20 and the floor frame structure 24 are also stiffened in the vicinity of the sliding door opening 22.

The frame stiffener 90 includes an interior side wall 150, an exterior side wall 152, and the bottom wall 140 interconnecting the interior side wall 150 to the exterior side wall 152. The interior side wall 150 generally follows the contour of the inner side wall 100 of the longitudinal floor frame member 20. The interior side wall 150 contacts and connects with the exterior of the inner side wall 100 of the longitudinal floor frame member 20. The exterior side wall 152 contacts and connects with the outer side wall 102 of the longitudinal floor frame member 20.

The interior side wall 150 includes a substantially vertical top section 154, a substantially vertical bottom section 156 offset horizontally from the top section 154 and an angled transition section 158 interconnecting the top section 154 to the bottom section 156. Similarly, the exterior side wall 152 includes a substantially vertical top section 164, a substantially vertical bottom section 166 offset horizontally from the top section 164 and an angled transition section 168 interconnecting the top section 164 to the bottom section 166. The substantially vertical upper section 114 of the inner side wall 100 of the longitudinal floor frame member 20 contacts the substantially vertical top section 154 of the interior side wall 150 of the frame stiffener 90. Similarly, the substantially vertical upper section 124 of the outer side wall 102 of the longitudinal floor frame member 20 contacts the substantially vertical top section 164 of the exterior side wall 152 of the frame stiffener 90. The substantially vertical bottom section 156 of the interior side wall 150 contacts the substantially vertical lower section 116 of the inner side wall 100. Similarly, the substantially vertical bottom section 166 of the exterior side wall 152 contacts the substantially vertical lower section 126 of the outer side wall 102. The tapering transition sections 118, 128 are slightly offset from the respective angled transition sections 158, 168 to form a respective small gap 170, 172.

A width w1 of the bottom wall 140 of the frame stiffener 90 measured in a transverse direction between the interior side wall 150 and the exterior side wall 152 is less than a width w2 of the lower wall 70 of the longitudinal floor frame member 20 measured in the transverse direction between the inner side wall 100 and the outer side wall 102. The interior side wall 150 of the frame stiffener 90 includes a diagonally angled section 174 extending between a substantially vertical section (the substantially vertical bottom section 156) of the interior side wall 150 and the bottom wall 140. The diagonally angled section 174 tapers downwardly and outwardly from the inner lower corner 130 of the longitudinal frame member 20 toward the bottom wall 140 of the frame stiffener 90. In contrast, the substantially vertical bottom section 166 of the exterior side wall 152 continues vertically downward and parallel with the substantially vertical lower section 126 of the outer side wall 102 between the outer lower corner 132 and the bottom wall 140 of the frame stiffener.

With reference to FIG. 4, the bottom wall 140 of the frame stiffener 90 contacts the lower wall 70 of the longitudinal floor frame member 20 at the lower section 72 and the rear section 80. The bottom wall 140 can be offset from the lower wall 70 (such as that shown in FIG. 7) at positions between the lower section 72 and the rear section 80, such as the forward transition section 74, the higher section 76, and the rearward transition section 78. The bottom wall 140 of the frame stiffener 90 includes an upwardly sloping portion 176 that slopes upwardly and rearwardly.

With reference to FIG. 4, the frame stiffener 90 includes a rear trailing arm mount opening 180 configured to receive a rear trailing arm mount 182. The frame stiffener 90 includes a forward end 190 and a rear end 192. The bottom wall 140 of the frame stiffener 90 contacts the lower wall 70 of the longitudinal floor frame member 20 near the forward end 190 of the frame stiffener 20 and the rear end 192 of the frame stiffener. The rear trailing arm mount opening 180 is located nearer the rear end 192 as compared to the forward end 190. The rear trailing arm mount 182 can connect with the rear section 80 of the lower wall 70 of the longitudinal floor frame member 20 and the rear trailing arm mount opening 180 accommodates the rear trailing arm mount. The rear trailing arm mount 182 connects with a rear trailing arm 184, which is a component of a rear wheel suspension.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame structure comprising:
a longitudinal floor frame member for connecting with a vehicle floor panel to form a substantially closed cross section, the floor frame member including a lower wall including a lower section, a higher section and a transition section disposed between the lower section and the higher section, wherein the lower wall transitions upwards along the transition section from the lower section to the higher section; and
a frame stiffener connected with the floor frame member on an exterior of the floor frame member, the frame stiffener having a substantially U-shaped configuration in cross section and including a bottom wall that is vertically offset below the lower wall at least along a portion of the transition section.

2. The structure of claim 1, wherein the longitudinal floor frame member is generally U-shaped in cross section and includes an inner side wall, an outer side wall, the lower wall interconnecting the inner side wall and the outer side wall, an inner flange extending inwardly away from the inner side wall and an outer flange extending outwardly away from the outer side wall, wherein an uppermost surface each flange is configured to contact and connect with a lower surface of the floor panel.

3. The structure of claim 2, wherein the frame stiffener includes an interior side wall connected with the inner side wall of the longitudinal floor frame member, an exterior side wall connected with the outer side wall of the longitudinal floor frame member and the bottom wall interconnecting the interior side wall and the exterior side wall.

4. The structure of claim 3, wherein a width of the bottom wall measured in a transverse direction between the interior side wall and the exterior side wall is less than a width of the lower wall measured in the transverse direction between the inner side wall and the outer side wall.

5. The structure of claim 4, wherein the interior side wall includes a diagonally angled section extending between a substantially vertical section of the interior side wall and the bottom wall.

6. The structure of claim 5, wherein the diagonally angled section tapers downwardly and outwardly from an inner lower corner of the longitudinal floor frame member toward the bottom wall.

7. The structure of claim 3, wherein each of the inner side wall and the outer side wall includes a substantially vertical upper section, a substantially vertical lower section offset horizontally from the upper section and a tapering transition section interconnecting the upper section to the lower section.

8. The structure of claim 7, wherein each of the interior side wall and the exterior side wall includes a substantially vertical top section, a substantially vertical bottom section offset horizontally from the top section and an angled transition section interconnecting the top section to the bottom section, wherein the upper section of each side wall contacts a respective top section of a respective interior wall, wherein the lower section of each side wall contacts a respective bottom section of a respective.

9. The structure of claim 1, wherein the bottom wall of the frame stiffener contacts the lower wall of the floor frame member near a forward end of the frame stiffener and a rear end of the frame stiffener.

10. The structure of claim 9, wherein the transition section disposed between the lower section and the higher section is a forward transition section, wherein the floor frame member includes a rear section and a rear transition section disposed between the higher section and the rear section, wherein the lower wall transitions downwards along the rear transition section from the higher section to the rear section.

11. The structure of claim 10, wherein the bottom wall of the frame stiffener contacts the lower wall at the lower section and the rear section.

12. The structure of claim 1, wherein the frame stiffener includes a rear trailing arm mount opening configured to receive a rear trailing arm mount.

13. The structure of claim 12, wherein the frame stiffener includes a forward end and a rear end, the rear trailing arm mount opening is located nearer the rear end as compared to the forward end.

14. A vehicle body structure comprising:
a vehicle body including a floor panel and defining a sliding door opening;
a longitudinal floor frame member connected with a lower surface of the floor panel to form a substantially closed cross section, the floor frame member including a lower wall including a lower section, a higher section and a transition section disposed between the lower section and the higher section, wherein the lower wall transitions upwards along the transition section from the lower section to the higher section, and at least a portion of the transition section is positioned in a longitudinal direction between a forward edge and a rearward edge of the sliding door opening; and
a frame stiffener connected with the floor frame member, the frame stiffener having a substantially U-shaped configuration in cross section and including a bottom wall that is vertically spaced from the floor frame member at least along a portion of the transition section.

15. The structure of claim 14, further comprising a rear trailing arm mount connected with the longitudinal floor frame member and the frame stiffener includes an opening through which the rear trailing arm mount extends.

16. The structure of claim 14, wherein the lower section of the lower wall of the longitudinal floor frame member is positioned in front of the higher section in the longitudinal direction.

17. The structure of claim 16, wherein the bottom wall of the frame stiffener includes an upwardly sloping portion that slopes upwardly and rearwardly.

18. The structure of claim 17, wherein the lower wall includes a rearward transitioning section where the lower wall transitions downwardly from the higher section toward a generally horizontal rear section, and the bottom wall of the frame stiffener contacts the lower wall of the longitudinal floor member at the generally horizontal rear section.

19. The structure of claim 18, wherein the bottom wall of the frame stiffener is offset below the lower wall of the longitudinal floor frame member between the transition section and the rear section.

\* \* \* \* \*